United States Patent [19]
Hayashi et al.

[11] Patent Number: 5,725,255
[45] Date of Patent: Mar. 10, 1998

[54] FIXTURE FOR FITTING PIPE JOINT TO CHANGE-OVER VALVE

[75] Inventors: Bunya Hayashi; Makoto Ishikawa, both of Yawara-mura, Japan

[73] Assignee: SMC Corporation, Tokyo, Japan

[21] Appl. No.: 685,982

[22] Filed: Jul. 22, 1996

[30] Foreign Application Priority Data

Aug. 7, 1995 [JP] Japan .................. 7-221063

[51] Int. Cl.$^6$ ........................... F16L 35/00
[52] U.S. Cl. ........................... 285/26; 285/124.5
[58] Field of Search ............. 285/26, 29, 137.1, 285/124.1, 124.2, 124.3, 124.4, 124.5

[56] References Cited

U.S. PATENT DOCUMENTS

| | | |
|---|---|---|
| 3,282,612 | 11/1966 | Younger . |
| 3,869,152 | 3/1975 | Devincent et al. ............. 285/137.1 |
| 3,929,356 | 12/1975 | Devincent et al. ............. 285/137.1 X |

FOREIGN PATENT DOCUMENTS

| | | |
|---|---|---|
| 41 38 064 | 5/1993 | Germany . |
| 6 1983 | 1/1994 | Japan . |
| 2 245 946 | 1/1992 | United Kingdom . |
| 2 278 657 | 12/1994 | United Kingdom . |
| 2 283 070 | 4/1995 | United Kingdom . |
| 9322594 | 11/1993 | WIPO ..................... 285/26 |

*Primary Examiner*—Dave W. Arola
*Attorney, Agent, or Firm*—Oblon, Spivak, McClelland, Maier, & Neustadt, P.C.

[57] ABSTRACT

A fixture fastens pipe joints 5 to multiple ports 35A, 35B, 36A and 36B that are arranged substantially in a line in a port block 4 attached to the valve body 6 of a change-over valve 1. The fixture comprises a metal fixture insertion groove 40 cut from one side of the port block 4 to a depth reaching the individual ports, a metal fixture 41 having multiple recesses 44 arranged along one edge thereof so as to come into engagement with the pipe joints 5 when inserted in the metal fixture insertion groove, and bolts 48 for fastening the metal fixture 41 and port block 4 to the valve body 6.

3 Claims, 3 Drawing Sheets

FIXTURE FOR FITTING PIPE JOINT TO CHANGE-OVER VALVE

FIELD OF THE INVENTION

This invention relates to a fixture for fitting a pipe joint to a pipe connection port of a change-over valve to switch the flow of fluids.

DESCRIPTION OF THE PRIOR ART

Tube connection to a known change-over valve is achieved through a port block with multiple output ports individually communicating with the output ports of the valve proper that is attached to the front end of the valve body where the output ports open. To facilitate tube connection, a quick-fit pipe joint is usually fitted to each output port of the port block.

The quick-fit pipe joint of known type has an engaging means that catches the tube that is inserted therein. The tube thus caught in position is freed when a releasing means is pushed.

The pipe joint just inserted in the output port will come off if any external force acts on the pipe joint itself or the tube. Therefore, various methods are employed to fix the pipe joint in the output port.

For example, Japanese Provisional Patent Publication No. 1983 of 1994 discloses an S-shaped metal fixture.

This S-shaped metal fixture is inserted in the output port, with two pipe joints fitted thereto, and fastened to the valve body. While the S-shaped metal fixture provides a firm connection between the pipe joint and port, fitting is not very easy because the two pipe joints fitted to both ends of the S-shaped fixture must be inserted in the corresponding ports and the fixture too must be fastened to the valve body.

SUMMARY OF THE INVENTION

An object of this invention is to provide a pipe joint fixture that permits fitting multiple pipe joints to multiple ports with ease and certainty.

Another object of this invention is to provide a functionally designed pipe joint fixture that can be used also for the fastening of a multi-port port block to the valve body of a change-over valve.

Still another object of this invention is to provide a rationally designed pipe joint fixture that permits efficient fitting of multiple pipe joints in a small space.

To achieve the above objects, a pipe joint fixture of this invention connects pipe joints for tube connection to multiple ports that are arranged substantially in one line on a port block attached to the valve body of a change-over valve. The pipe joint fixture has a metal fixture insertion groove that extends from one side of the port block to a depth reach a part of the individual ports, a sheet-formed metal fixture adapted to fit in the insertion groove and having multiple recesses provided along one edge thereof and adapted to engage with the pipe joints in the individual ports when inserted in the insertion groove, and means for fastening the metal fixture to the port block.

When a pipe joint is inserted in each of the ports provided in the port block and the metal fixture is inserted in the insertion groove and fixed in the port block, the pipe joints are fixed in position by the metal fixture by engaging with the multiple recesses provided therein.

Thus, all pipe joints are fixed in position with ease and certainty by fastening a metal fixture to the port block by simply inserting the metal fixture in the insertion groove.

In a preferred embodiment of this invention, the fastening means comprises multiple bolts. While the bolts double as a means for fastening the port block to the valve body, the metal fixture doubles as washers when the bolts are tightened.

Fastening of the metal fixture to the port block and fastening of the port block to the valve body can be accomplished with ease, using only one fastening means. Simplification of the fastening means permits simplifying the structure, reducing the number of component parts, and facilitates the fabrication thereof.

Because the metal fixtures double as washers, the port block may be made of not only metal but also synthetic resin or other similar material. This advantage facilitates the manufacture of the port block and reduces the manufacturing cost and weight thereof.

It is preferable that the multiple ports are arranged not in a straight line but in a somewhat horizontally staggerd fashion.

The horizontally staggerd arrangement permits reducing the center-to-center distance between the individual ports, as compared with the straight line arrangement. This reduction permits efficient fitting of multiple pipe joints in a limited space, thereby reducing the size of the port block and the change-over valve.

DETAILED DESCRIPTION OF THE INVENTION

Figure 1:
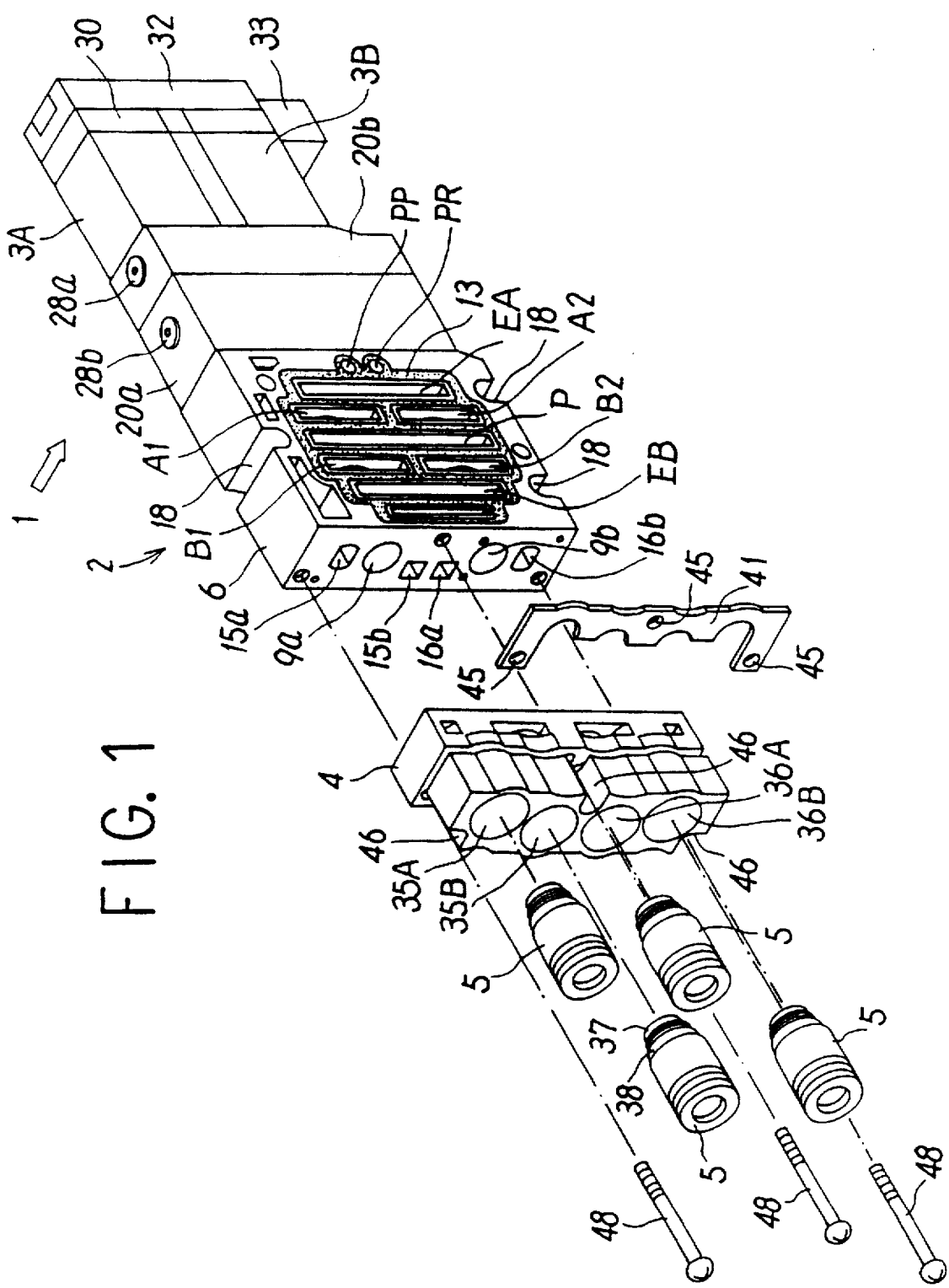
FIG. 1 is a perspective exploded view showing the principal parts of a change-over valve to which an embodiment of this invention is applied.
Figure 2:
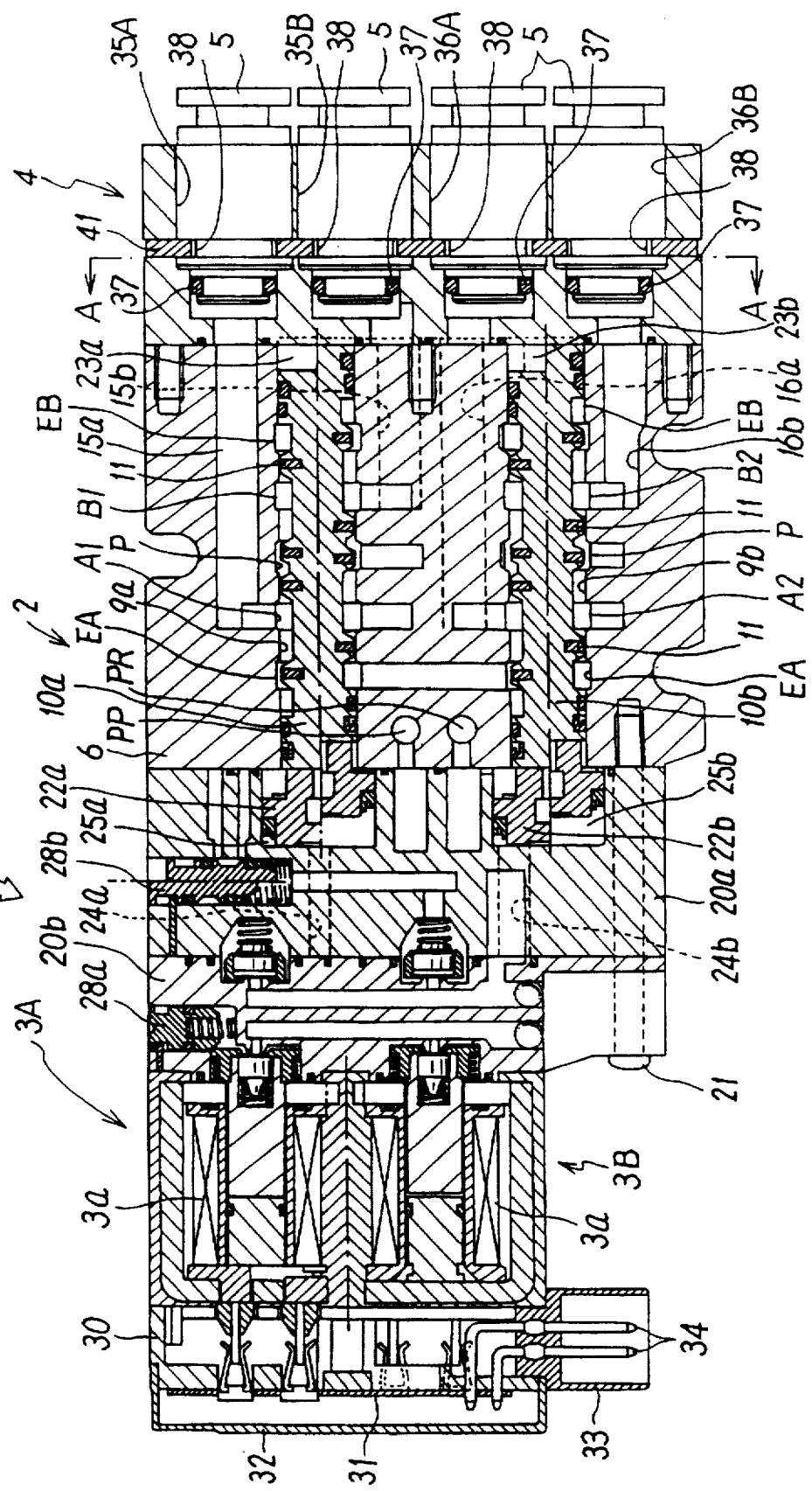
FIG. 2 is a vertical cross-sectional view of the same change-over valve in an assembled condition.

FIGS. 1 and 2 show an embodiment of this invention. A change-over valve 1 comprises a main valve 2 that incorporates two independently functioning switching mechanisms in one valve body 6 and two solenoid pilot valves 3A and 3B that actuate the valve bodies 10a and 10b of the two switching mechanisms. Multiple change-over valves, each of which is essentially a pilot-type change-over valve, can be used in an assembly in which they are placed one next to another.

In front of the valve body 6 of the main valve 2 is provided a port block 4 that has two sets of output ports 35A, 35B, 36A and 36B (i.e. four ports) corresponding to the two switching mechanisms. A quick-fit pipe joint 5 is fitted in each output port.

The valve body 6 of the main valve 2 is substantially cuboidal. A supply conduit P and discharge conduits EA and EB to supply and discharge compressed air or other pressurized fluid, pilot supply and discharge conduits PP and PR run across the width of the valve body, extending in the direction in which multiple valve bodies are joined together. Two valve ports 9a and 9b, one on top of the other, are provided to extend perpendicular to the conduits described above.

The valve ports 9a and 9b communicate with the supply conduit P and discharge conduits EA and EB. The upper valve port 9a communicates with output conduits A1 and B1 provided between the supply conduit P and the discharge conduits EA and EB. The lower valve port 9b communicates with output conduits A2 and B2 provided between the supply conduit P and the discharge conduits EA and EB.

Valve bodies 10a and 10b hermetically and slidably fitted in the valve ports 9a and 9b have multiple grooves cut around the periphery thereof. Hermetic sealing materials 11 fitted in the grooves slide along the valve ports, thereby switching the communication of the output conduit between the supply and discharge conduits.

The output conduits A1 and B1 communicating with the valve port 9a respectively communicate with output ports 15a and 15b opening in the front end of the valve body 6. Similarly, the output conduits A2 and B2 communicating with the valve port 9b respectively communicate with output ports 16a and 16b. The output ports 15a to 16b are vertically arranged in an almost but not completely straight line.

The two sets of output conduits A1, B1, A2 and B2 open in one of the contact faces of the valve body 6. The output conduits A1 to B2 are closed by an adjoining change-over valve and, therefore, do not communicate with the output conduits in other change-over valves. On the other hand, the supply conduit P, discharge conduits EA and EB, pilot supply and discharge conduits PP and PR are hermetically separated by a gasket 13 attached to the contact faces of the valve body 6, whereby communication with the same conduits in other change-over valves is secured.

To the rear end of the valve body 6 are integrally fastened sub-bodies 20a and 20b and an assembly of the pilot valves 3A and 3B by multiple fastening bolts.

The sub-body 20a have piston chambers of a larger diameter than the valve ports 9a and 9b opening in one end thereof. Pistons 22a and 22b to switch the valve bodies 10a and 10b are slidably fitted in the piston chambers. Pressure chambers 23a and 23b at the other end of the valve ports 9a and 9b opposite to the piston chambers communicate with the supply conduit P by means of a conduit (not shown) provided in the valve body 6.

Each of the pilot valves 3A and 3B has a pilot supply port, a pilot output port and a pilot discharge port. The pilot valves are three-port valves of the known type in which communication of the pilot output port with the pilot supply and discharge ports is switched by the on-off operation of solenoids 3a.

The pilot supply ports of the pilot valves 3A and 3B communicate with the pilot supply conduit PP by means of through-bores not shown. The pilot output ports individually communicate with pilot chambers behind the pistons by means of pilot output through-bores 24a and 24b, while the pilot discharge ports and breathing chambers between the pistons and the valve bodies communicate with the pilot discharge conduit PR by means of pilot discharge through-bores not shown.

The sub-body 20b has a first push button 28a that directly connects the pilot supply conduit to the pilot output through-bore 24a when pressed down, whereas the sub-body 20a has a second push button 28b that directly connects the pilot supply conduit to the pilot output through-bore 24b.

A terminal base 30 and a cover thereof 32 are attached to one end of the pilot valves 3A and 3B opposite to the main valve 2. A terminal board 31 attached to the terminal base 30 supplies electricity to the solenoids 3a. The terminal board 31 is electrically connected to power-receiving terminals 34 contained in a terminal box 33 below the terminal base 30.

When pilot air is supplied from the pilot valves 3A and 3B to the pilot chambers 25a and 25b, the valve bodies 10a and 10b of the main valve 2 axially move to the right (see the lower half of FIG. 2). Then, the supply conduit P communicates with the output conduits A1 and A2, while the output conduits B1 and B2 communicate with the discharge conduit EB, thereby discharging the pilot air from the pilot chambers 25a and 25b. As a consequence, the pressurized fluid in the pressure chambers 23a and 23b exerts a force to move the valve bodies 10a and 10b to the left (see the upper half of FIG. 2), thereby establishing communication between the supply conduit P and the output conduits B1 and B2 and between the output conduits A1 and A2 and the discharge conduit EA. This structure is substantially that of a five-port valve.

The on-off control of the pilot valves 3A and 3B is not always done simultaneously but individually.

Figure 3:
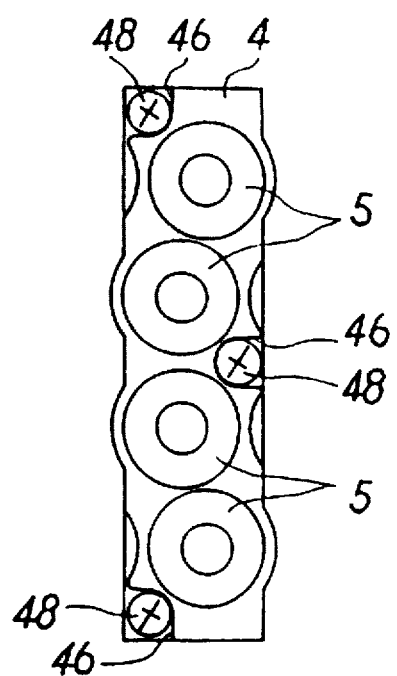
FIG. 3 is an elevation showing the right side of the change-over valve in FIG. 2.
Figure 4:
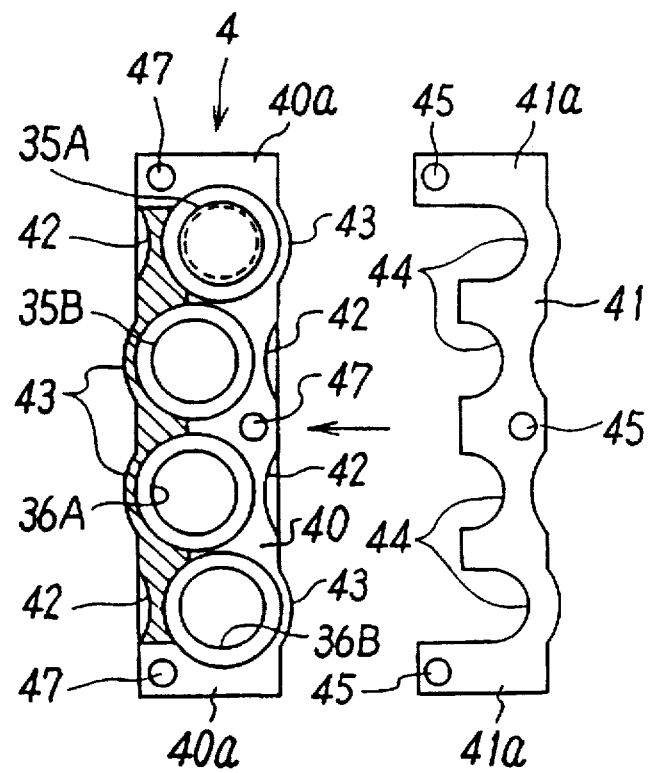
FIG. 4 is a cross-sectional view taken along the line IV—IV in FIG. 2.

The port block 4 attached to the valve body 6 has four output ports 35A, 35B, 36A and 36B that individually communicate with the output ports 15a, 15b, 16a and 16b in the valve body 6 at the front end thereof, as shown in FIGS. 3 and 4.

The output ports 35A, 35B, 36A and 36B are vertically arranged in an almost but not completely straight line. The two sets of output ports 35A and 36B at the top and bottom and 35B and 36A in between are horizontally staggerd from each other to some extent. This arrangement is more compact than the completely straight one, thus permitting the attachment of the multiple pipe joints in a small space and, as a consequence, reducing the size of the port block 4 and the change-over valve 1.

Projections 43 are formed where the output ports are closer to the surface on both sides of the port, with corresponding recesses formed opposite to the individual projections. When two or more change-over valves 1 are joined together, the recesses 42 fit in the corresponding projections 43.

A metal fixture insertion groove 40 reaching a part of the output ports 35A, 35B, 36A and 36B is cut from one side of the port block 4. The groove having the upper and lower ends 40a extends over the entire length of the port block 4.

A metal fixture 41 is inserted in the groove 40 to fasten the pipe joints 5 in the individual output ports. The metal fixture 41 is in sheet form, with multiple recesses 44 adapted to engage with engaging grooves 38 at one end of the pipe joints 5 formed along one edge thereof. When the metal fixture 41 is inserted in the groove 40, the recesses 44 automatically engage with the pipe joints 5 in the output ports 35A, 35B, 36A and 36B.

Irrespective of the number of pipe joints 5, or even when the pipe joints 5 have been pre-inserted in the output ports, all pipe joints 5 are brought into secure engagement with the metal fixture 41 by simply inserting the metal fixture 41 into the insertion groove 40.

The metal fixture 41 has holes 45 through which bolts 48 are passed in the upper and lower ends 41a and 41b thereof and in between. Similar holes 47 are provided at corresponding points in the port block 4. The bolts 48 passed through the holes 45 and 47 fasten the metal fixture 41 to the port block 4 and, in turn, the port block 4 to the valve body 6 of the main valve 2.

The bolts 48 double as means to fasten the metal fixture 41 to the port block 4 and the port block 4 to the main valve.

Fastening the metal fixture 41 and port block 4 with the same fastening means simplifies the structure of the change-over valve 1, reduces the number of component parts, and facilitates the fabrication thereof.

Recesses 46 are provided in the surface of the port block 4 where the bolts 48 are tightened to bring the heads of the bolts into direct contact with the metal fixture 41. Thus, the metal fixture 41 serves as washers for the bolts 48.

Using the metal fixture 41 as washers permit making the port block 4 of other materials than metal, such as synthetic resin. This facilitates the manufacture of the port block 4 and reduces the manufacturing cost and weight thereof.

Reference numeral 18 designates recessions to pass bolts for fastening together multiple change-over valves 1, whereas reference numeral 37 denotes sealing rings fitted over the pipe joints.

While the embodiment just described is a pilot-type change-over valve having two switch mechanisms incorporated in the valve body 6, this invention should not be limited thereto. Instead, this invention is also applicable to change-over valves containing one switching mechanism or three or more switching mechanisms and change-over valves of other types than the pilot type, such as those whose valve bodies are directly actuated by solenoid or other means.

Thus, all pipe joints are securely fastened by simply inserting the metal fixture into the insertion groove, irrespective of the number of pipe joints, or even when the pipe joints have been pre-inserted in the output ports.

Fastening of the metal fixture to the port block and fastening of the port block to the valve body can be accomplished with ease, using only one fastening means. Simplification of the fastening means permits simplifying the structure, reducing the number of component parts, and facilitates the fabrication thereof.

The metal fixtures doubling as washers permits making the port block of not only metal but also synthetic resin or other similar material. This advantage facilitates the manufacture of the port block and reduces the manufacturing cost and weight thereof.

The horizontally staggerd arrangement permits reducing the center-to-center distance between the individual ports. This reduction permits efficient fitting of multiple pipe joints in a limited space, which is conducive to reducing the size of the port block and the change-over valve.

What is claimed is:

1. A change-over valve, comprising:

a valve body;

a port block attached to said valve body, said port block having multiple ports substantially in a line;

pipe joints attached to said pert block for connecting tubes to said multiple ports;

an insertion groove formed in one side of the port block extending to a depth so as to reach a part of said multiple ports;

a metal fixture in sheet form shaped to fit in said insertion groove and having multiple recesses arranged along one edge thereof so as to engage said pipe joints when inserted in the insertion groove; and means for fastening the metal fixture to the port block.

2. The valve according to claim 1, wherein the means for fastening includes multiple bolts which also fasten the port block to the valve body and wherein the metal fixture acts as washers when the bolts are tightened.

3. The valve according to claim 1 or 2, in which the multiple ports are horizontally staggered from each other.

* * * * *